United States Patent [19]
Mazur et al.

[11] Patent Number: 6,023,984
[45] Date of Patent: Feb. 15, 2000

[54] DYNAMIC PROXIMITY TEST APPARATUS

[75] Inventors: Joseph F. Mazur, Washington; Brian K. Blackburn, Rochester; Scott B. Gentry, Romeo; Kurt W. Schulz; Matthew W. Owen, both of Harper Woods; James C. Lotito, Warren; Timothy W. Hill, Sterling Heights, all of Mich.

[73] Assignee: Breed Automotive Technology, Inc., Lakeland, Fla.

[21] Appl. No.: 09/014,817

[22] Filed: Jan. 28, 1998

[51] Int. Cl.$^7$ ................................................. G01M 19/00
[52] U.S. Cl. ............................................................ 73/865.3
[58] Field of Search ............................... 73/865.3, 865.6, 73/865.9; 280/735, 732, 730, 734; 180/273; 364/424.05, 425.5; 340/32

[56] References Cited

U.S. PATENT DOCUMENTS 5,871,232  2/1999  White ...................................... 280/735
5,918,696  7/1999  Van Voorhies ........................... 180/273

Primary Examiner—William Oen
Attorney, Agent, or Firm—Markell Seitzman

[57] ABSTRACT

A test apparatus (20) for testing the dynamic performance and verifying the performance of at least one occupant sensor (82) used in a vehicular safety restraint system comprising: a movable sled slidably oriented relative to the occupant sensor; an object, the presence of which is to be sensed by the sensor, mounted and movable with the sled; a support (22, 24, 26a,b, 32, 36) for slidably supporting the sled relative to the sensor (82); a force producing device (90a,b, 92, 94) for moving the sled toward the sensor in a determinable manner; a data collection device (84) for comparing signals derived from the occupant sensor indicative of the relative position to the object with signals derived upon independent measurement of the motion of the sled.

16 Claims, 2 Drawing Sheets

_US 6,023,984_

DYNAMIC PROXIMITY TEST APPARATUS

BACKGROUND AND SUMMARY OF THE INVENTION

The invention generally relates to an apparatus and method of testing the performance of a sensing system including a plurality of sensors in a simulated crash environment.

Safety restraint systems that are used to protect occupants during a crash have evolved to what is called a "smart system." These smart systems typically include at least one, but typically a plurality of different sensors which generate control signal to activate one or more safety restraint devices such as air bag, pretensioners (or belt tighteners) or the like to protect the occupant. These sensors are positioned within the passenger compartment of a vehicle to determine the position, speed and, perhaps, acceleration of the occupant relative to a part of the vehicle compartment such as the location of a deployable air bag located in the steering wheel and or instrument panel.

Currently in the design and testing of existing systems it is commonplace that the various smart restraint sensors are first located within a mockup of a vehicle compartment at pre-determined locations, and then tested in a generally static environment that is one in which a simulated object is stationary or slowly moved into the range of the sensor. Subsequently the sensor system is tested dynamically in conjunction with a high "g" crash sled and movable and instrumented crash dummy. As can be appreciated by one skilled in the art utilizing a crash sled is time consuming and extremely expensive.

It is an object of the present invention to provide an environment in which one or more smart restraint sensors can be tested in a dynamic environment independent of a high "g" crash sled.

It is a further object of the present invention to provide a test sled in which a simulated occupant is accelerated toward one or more sensors to simulate and verify the performance of these sensors and associated electronic control system in a dynamic situation.

Accordingly the invention comprises: a test apparatus (20) for testing the dynamic performance of at least one occupant sensor (82) used in a vehicular safety restraint system comprising: first means translationally oriented relative to the sensor; an object, the presence of which is to be sensed by the sensor, mounted and movable with the first means; support means (22, 24, 26a,b, 32, 36) for supporting the first means for movement relative to the sensor (82); force producing means (90a,b, 92, 94) for moving the first means toward the sensor in a determinable manner and means for collecting and comparing data derived from the sensor with data derived from measuring the motion of the first means.

Many other objects and purposes of the invention will be clear from the following detailed description of the drawings.

DETAILED DESCRIPTION OF THE DRAWINGS

Figure 1:
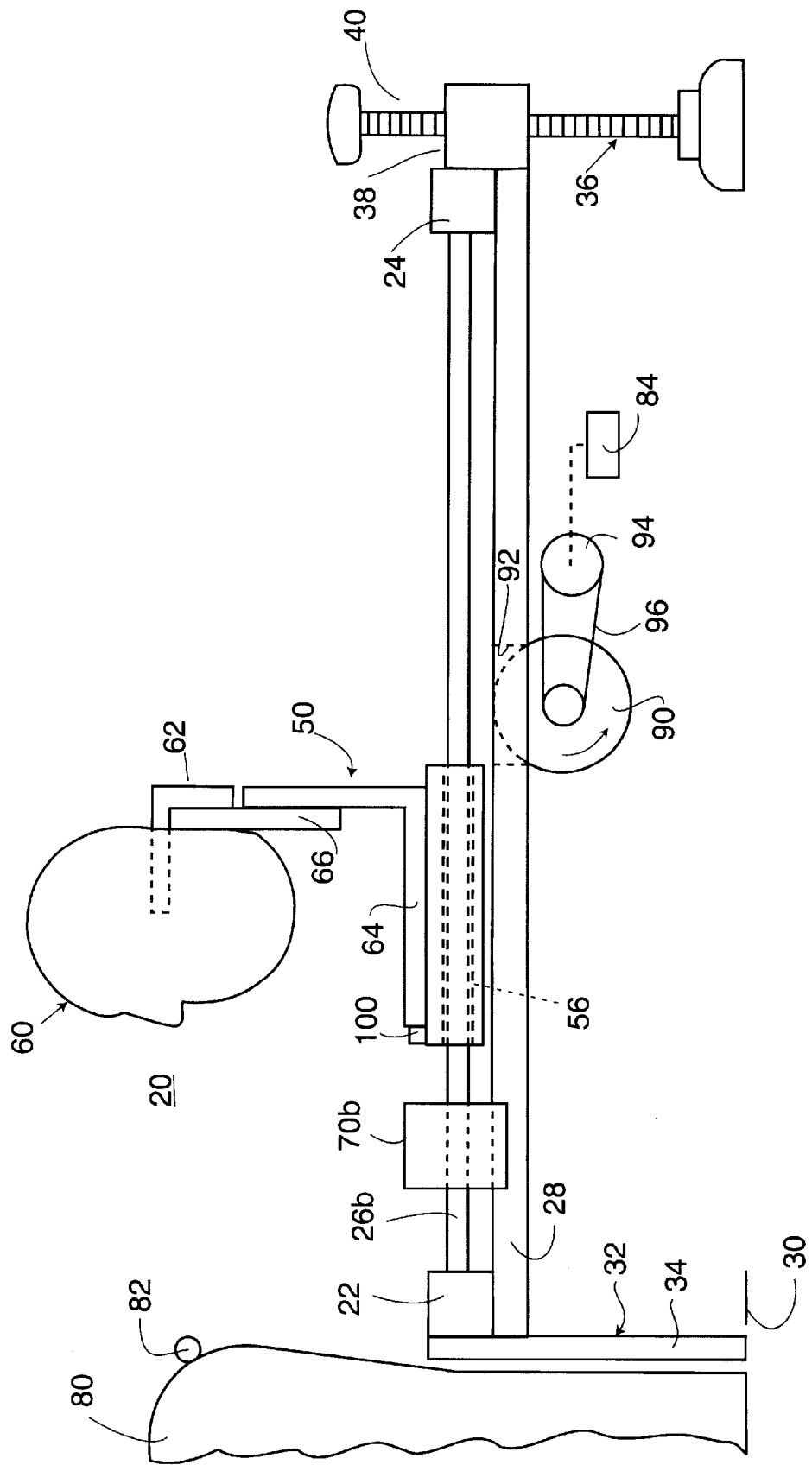
FIG. 1 illustrates a side view showing many of the major components of the present invention.
Figure 2:
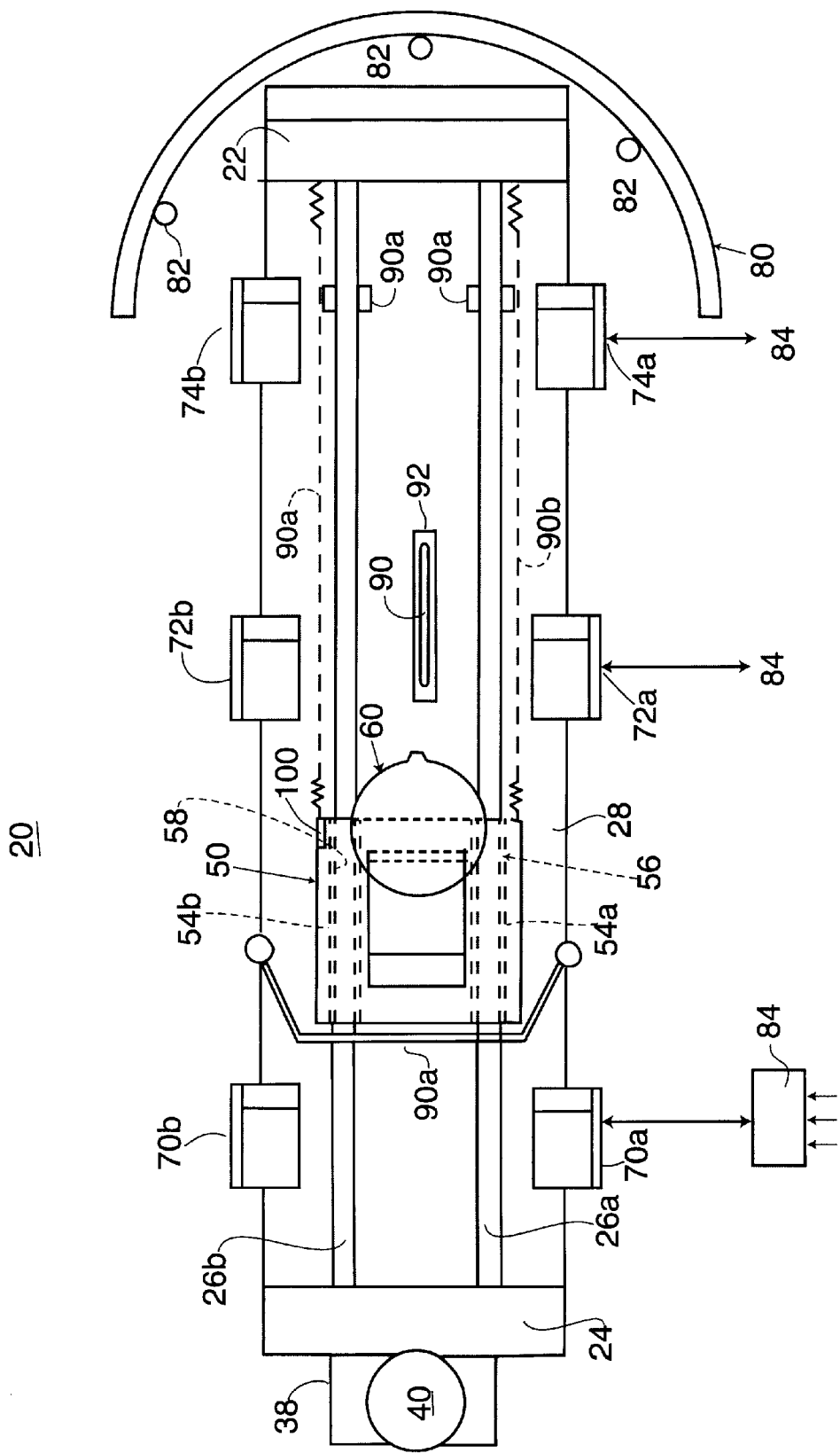
FIG. 2 illustrates a top plan view of the device shown in FIG. 1.

One of the additional deficiencies in testing a sensor system on a dynamic crash sled is that the sled typically only simulates the crash event, which is completed in less than 120 milliseconds. During this short interval it is difficult to verify the dynamic performance of the sensors. It can be appreciated that during an actual crash event the occupant (to be sensed by the plurality of sensors) will begin to move from his or her generally static, seated position during a pre-crash event period in which the vehicle may decelerate as the driver applies the vehicle brakes. As can further be appreciated, the entire crash event is then a combination of a braking interval followed by an interval of rapid acceleration/deceleration, both of which are now capable of being simulated by the resent invention. It should also be appreciated by one skilled in the art that other forces can cause significant occupant displacement prior to the crash such as curb hops, small trees or possibly a railroad tie hanging up the number two cross member in the vehicle. With reference to FIGS. 1 and 2, a first embodiment of the invention is illustrated. More particularly, FIGS. 1 and 2 illustrate a test apparatus or system generally shown as 20. This apparatus 20 includes a first or forward guide rail support 22 and a second or rear guide rail support 24. Two spaced guide rails 26a and 26b connect the supports 22 and 24. It should be appreciated that only one guide rail is needed. An optional base plate 28 may also be used to provide additionally structural support for the assembly. Both guide rail supports 22 and 24, as well as the base plate 28, are elevated relative to a datum generally shown as numeral 30 by a first (front) and second (aft) support mechanism 32 and 36 respectively. As an example, the first support mechanism 32 may be a fixed support to elevate the guide rails a fixed distance above the datum. The second support 36 can also be a similar fixed device as well. Further, this support mechanism 32 whether used on the front and the rear of the sled 20 may include one or more support legs 34. A second support mechanism generally shown as 36 can be obtained utilizing a jack screw support block 38 through which an adjustable jack screw 40 is received such that the apparatus 20 can be positioned vertically by a rotation of the jack screw 40. As can further be appreciated, one or more variable adjusting mechanisms 36 can be utilized to support the apparatus 20.

Slidably positioned on the guide rails 26a and 26b is a mini-sled generally shown as 50. The sled includes a guide plate 52 having a plurality of through bores 54a and 54b. Situated within these bores is a hollow bearing 56 such as a linear type bearing of known variety. Each guide rail 26a and 26b is slidably received within a respective through bore 58 formed within each of the bearings 56. Mounted upon the sled 50 is a test object generally shown as 60. This test object needs only be large enough to provide a surface to be sensed by the occupant sensor 82. As illustrated in FIG. 1, this test object may be a head, arm, hand, and/or portion of a torso taken from a typical crash test dummy. Depending upon the side of the sled 50, the object 60 may include a full size crash dummy seat upon a seat (not shown). To provide the ability of varying the position of the test object 60 relative to the datum 30, as well as to the mounted position of the various sensors (to be tested), the sled 50 includes an adjustable first bracket 62 upon which the object 60 is mounted. The support or bracket 62 is supported via a lower mounting bracket 64 by an adjustable bracket 66. The particular means of achieving the variable adjustment is of no particular importance to the present invention.

Again with reference to FIGS. 1 and 2, it can be seen that a plurality of sets of motion sensors 70a, 70b, 72a, 72b and 74a and 74b are mounted between the front and rear guide rail supports 22 and 24 respectively. In the illustrated embodiment, these sets of sensors are secured to the base plate 28.

When in use, the apparatus 20 is positioned relative to one or more sensors 82 to be tested. These sensors can be mounted on separate individual support mechanisms relative to the apparatus 20 or mounted on an actual portion 80 of the passenger compartment as shown in FIGS. 1 and 2. This portion 80 is only diagrammatically shown in FIGS. 1 and 2 and can include the vehicle's instrument panel, dashboard, headliner, steering wheel, windshield, side panel and/or doors. As can be appreciated, the apparatus 20 is configured to simulate the approximate seated position and the ensuing motion of the simulated occupant 60. The various sensors located on the portion of the passenger compartment 80 are generally shown by numerals 82. The actual sensor or array of sensors will depend on the particular system design. As can be appreciated, the sensors 82 can be ultra-sonic, microwave, capacitive, etc.

While in use, the mini-sled 50 is accelerated towards the sensor locations at a determinable speed. As such, the apparatus 20 includes a means for accelerating the sled 50. One such means may include one or more springs or bungee cords 90a and 90b connected between the slide plate 50 and the rails or base plate 28 22 to propel or push the sled forward. In operation, the sled 50 is moved rearwardly a determinable amount, held in position by a holding device (not shown) and released either by releasing the holding device or manually letting go of the sled, thereby permitting the spring 90a to accelerate the sled across the plane of the sensor pairs 70a,b; 72a,b; 74a,b. As can be appreciated after the spring or cord 90a detaches from the sled 50 the sled will move at a relatively constant velocity past the pairs of sensors 70, 72 and 74 toward the occupant sensors 82.

Each of occupant sensors 82 is connected to an electronic control unit 84 which also receives input signals generally shown as 86 received from the sensors 70a,b; 72a,b; and 74a,b. FIG. 2 also shows an alternate embodiment (in phantom line) in which the cord or cords 90a,b pull the sled 50 It should also be appreciated that the occupant form 60 can remain stationary and the occupant sensing array be accelerated toward the occupant form in a reverse pulse format.

As can be appreciated, a variety of means for accelerating the sled 50 can be used. As an example the sled can be attached to a DC motor an appropriate linkage such as a toothed track. In this embodiment the speed of the motor is controlled to provide the designed velocity and acceleration profile of the sled 50.

The springs 90a and /or 90b or other accelerating force producing mechanism will cause the sled 50 to move forward at a determinable preferably generally constant velocity. In the present invention this velocity is chosen to simulate that change in vehicle velocity which may occur during the pre-crash, brake application portion of the crash event, typically this change in velocity (or the constant velocity of the simulated environment) will be between 10 to 15.0 Kph. (6–8 miles per hour). A swinging pendulum can also be used to accelerate the sled toward the sensor array. The height and the angle of the object can be predetermined to supply the proper accelerating force.

As mentioned above, the entire crash event may include a pre-crash interval during which the vehicle exhibits a first determinable velocity change or acceleration followed by the actual crash event in which the relative acceleration or deceleration increases dramatically. The present apparatus 20 further includes means for accelerating the moving sled 50 toward the sensor locations to simulate the rapid deceleration that occurs during the actual crash event.

The present invention utilizes a friction wheel generally shown as 90 to provide the added acceleration. The wheel 90 is positioned within a cutout 92 in the base plate 28. The wheel 90 is rotated at a predetermined angular velocity by motor 94 which is controlled by the ECU 84. The motor 94 can directly drive the wheel 90 is drive the wheel through an intermediate gear or belt member 96.

With the sled 50 progressing down the guide rails 26a and 26b at a constant velocity (which simulates the pre-crash delta or velocity change between the occupant and the vehicle's frame of reference, that is, the array of sensors 82) which may occur as the vehicle is braked, the sled 50 will move above and contact the spinning wheel 90. Subsequently, after the wheel engages the bottom of the sled 50, the wheel 90 propels the sled 50 toward the sensor location at a determinable increased acceleration (simulating the rapid movement that exists during the crash event). As mentioned above, it should also be appreciated that instead of accelerating the occupant, dummy or occupant form 60, the occupant form 60 can remain stationary and the sensor system accelerated The sensors 70a,b, 72a,b and 74a,b are used to provide a confirmation of the position, velocity and force imparted to the test form/dummy/occupant 60 independent of that which might be derived from the output of the various sensors 82. In the illustrated embodiment of the invention three (or more) pairs of photonic sensors 70a,b, 72a,b and 74a,b are used, Three transmitting sensors such as diodes 70a, 72a and 74a emit a collimated beam of light (either visible or not visible/infrared) and are oriented orthogonal to the normal travel direction of the sled 50. Positioned directly across from the emitting or transmitting sensor is a corresponding receiving or photonic sensor 70b, 72b, 74b (see FIG. 1). The receiving sensor provides one logic level (high or low) if it continuously receives the transmitted light energy. As soon as this collimated beam is broken, the logic level changes. This change of logic level acts as a start (T0) trigger for a counter which may be within the ECMU 84. This counter continues to count until a second photo sensor pair is triggered (T1) by the sled passing its location. By knowing the total stored count and the distance between each pair of motion sensors and the location of the various occupant sensors 82, the relative position of the sled along the guide rail as well as to the distance to a specific occupant sensor 84, sled velocity and sled acceleration is easily calculated. As an example, since the first and second photonic sensor pairs (or any pair of sensors 70, 72 or 74) are located a fixed and known distance along the sled path, then this distance divided by the stored count (counter results are transformed to a time by simply clocking the counter at a fixed time) is the speed of the sled at that measurement point. In addition, one photonic sensor pair could also be used as a trigger to start the data acquisition system of a known variety which may also be part of the ECMU 84. Additional photonic sensors are mounted along the sled track at predefined positions to allow for independent verification of the time that the sled has passed through each zone or to permit data collection and position, velocity and acceleration computation at other points along the guide rails.

It is important, in smart restraint systems, to test and understand how the occupant sensors 82 and associated control unit and activation and control algorithm respond dynamically as the sled 50 with the simulated occupant approaches the sensors 82 and gets closer to the various obstructions within the passenger compartment.

Consider the following scenario for a vehicle crash where the actual occupant is positioned (or part of the occupant is positioned) within a zone that is close to the location of the air bag. Depending upon the severity of the accident it may be desirable to deactivate or prohibit the activation or change the inflation rate of an air bag to better protect the occupant in this particular accident. As can be appreciated in the sensor 82 (and associated computer and algorithm) is corrupted because of measurement or computational deficiencies the occupant sensor 82 will not be able to determine the precise position of the occupant during an actual crash and as such any corrective action taken by the restraint system may be inappropriate. The present system permits the system to be tested in a simulated environment to permit the identification of any such potential deficiencies and to permit corrective modification to be taken prior to installation into a vehicle.

In an alternate embodiment of the invention, a second sensor system can be employed which is an inertial accelerometer 100 mounted on the sled 50. The output of the accelerometer can be integrated to provide a measure of the relative velocity and position of the sled 50. This data as related below, can be compared to either or both the occupant sensor outputs or the outputs derived from the photonic motion sensors to provide yet another comparative reference. The accelerometer would typically be of low g classification capable of measuring accelerations within a range of about ±4.0 g's. The accelerometer 100 would be mounted to sense fore and aft acceleration/deceleration) of the sled.

It should be appreciated that the above system, in addition to providing an accelerative pulse to accelerate the sled 50 can be use to decelerate the sled 50. As the sled 50 is accelerated by some means the sled's acceleration will quickly approach zero g's (assuming relatively low friction) i.e. a constant velocity. The sled will remain at zero g's (constant velocity) until it meets a damper mechanism the purpose of which is to decelerate the sled. In one embodiment such damper mechanism can be realized by using a stationary or reverse rotating friction wheel 90. In another embodiment the damper mechanism includes a resilient shock absorbing member 90a arranged on one or both guide rails or upon the plate 28 to rapidly stop (decelerate) the sled while permitting the object 60 to continue to move in response to inertial forces acting thereon. When the sled encounters the damper mechanism the accelerometer will begin to read negative acceleration or deceleration , and will return to zero g's when the sled is stopped (it should be appreciated that the accelerometer system will also read rebound of the sled which will not be taken into consideration for our measurement purposes). After the acceleration trace is acquired it is simple to perform a classic first and second integral to gather velocity and displacement of the sled and occupant/dummy/form 60.

The following describes atypical procedure to verify the performance of an occupant sensor or array of sensors using the present invention:

1. With the apparatus 20 located adjacent the array of occupant sensors 82, accelerate the sled to a predetermined motion;
2. Using the photonic sensors 70 72 and/or 74 as a speed trap or motion sensor generate a trigger signal at time T0 to activate a digital counter and a second trigger signal to deactivate the counter and store the count for later use.
3. Utilizing the stored count and the physical dimensions of the apparatus determine speed, velocity and/or the acceleration of the sled.
4. Obtain first and second integrals of acceleration data as measured from an accelerometer 90.

5. Exercise the various occupant sensors 82, as the sled 50 is moving, to generate as appropriate measured position, velocity and acceleration data. Depending upon the type of occupant sensor and its defined output signal this might require the calculating or performing of first and/or second derivatives or integration to generated position, velocity and acceleration measurements
6. Storing the measured or calculated output variables defining the performance of each occupant sensor 82.
7. Optionally validating the robustness or correctness of the data measured or derived from the photonic sensors with position, velocity and acceleration data as collected or measured or calculated from an accelerometer 90 based system.
8. Comparing the measured or calculated positional information of each occupant sensor to corresponding data derived from the accelerometer based system.
9. Comparing the times that the occupant sensors 82 and times the speed trap sensors 70, 72 74 indicate the sled has moved through predefined zones.
10. Determining the validity of the performance of each sensor by correlating the occupant sensor data with data derived from the motion sensors 70, 72, 74 and or data derived from the accelerometer based system.

Many changes and modifications in the above-described embodiment of the invention can, of course, be carried out without departing from the scope thereof. Accordingly, that scope is intended to be limited only by the scope of the appended claims.

We claim:

1. A test apparatus (20) for testing the dynamic performance and to verify the performance of at least one occupant sensor (82) used in a vehicular safety restraint system comprising:

first means translationally oriented relative to the occupant sensor;

an object (60), the presence of which is to be sensed by the sensor, mounted and movable with the first means;

support means (22, 24, 26a,b, 32, 36) for slidably supporting the first means relative to the sensor (82);

force producing means (90a,b, 92, 94) for moving the first means toward the sensor in a determinable manner;

electronic means (84) for comparing signals derived from the occupant sensor indicative of the relative positional variables to the object with signals derived upon independent measurement of the motion of the first means.

2. The apparatus as defined in claim 1 wherein the force producing means includes means for moving the sled at a predetermined velocity.

3. The apparatus as defined in claim 2 wherein the predetermined velocity approximates the change in velocity which occurs as a vehicle is decelerated during a period of vehicle braking prior to a crash event.

4. The apparatus as defined in claim 3 further including acceleration means (90a,b) engagable with the first means for accelerating the first means from the predetermined velocity to an increased level of acceleration to simulated the deceleration which occurs during the crash event.

5. The apparatus as defined in claim 1 wherein a plurality of sensors to be tested are located in a defined array about the first means (50).

6. The apparatus as defined in claim 1 wherein the first means includes at least one guide rail (26a) longitudinally extending in front of the location of the sensor (82).

7. The apparatus as defined in claim 6 wherein the including a linear bearing (54*a*) cooperating with the at least one guide rail (24*a*) to permit the first means to slide thereon.

8. The apparatus as defined in claim 6 including a second guide rail (26*b*) sliding supporting the first means.

9. The apparatus as defined in claim 2 wherein the force producing means includes spring means for providing a propelling force to propel the first means at the predetermined velocity.

10. The apparatus as defined in claim 4 wherein the acceleration means includes a motor powered wheel (90) engagable with a portion of the first means for accelerating or decelerating the first means (20) to a determinable level.

11. The apparatus as defined in claim 1 wherein the first means includes object support means (62, 64 66) for supporting the object at variable elevations relative to a fixed datum.

12. The apparatus as defined in claim 11 wherein the object includes a portion of a test dummy including one of a) head and b) an portion of the torso and c) a body portion.

13. The apparatus as defined in claim 5 wherein the plurality of motion sensors are located in a portion of a vehicle passenger compartment (80) situated about the first means.

14. The apparatus as defined in claims 1 including a plurality of opposing sets of motion sensors positioned along the path of travel of the first means.

15. The apparatus as defined in claim 13 including an electronic control and monitoring unit (84) for collecting and storing data derived from the sensors and from the sled and comparing same.

16. The apparatus as defined in claim 1 including means (90*a*) for rapidly decelerating the first means.

* * * * *